(12) United States Patent
Müller

(10) Patent No.: US 6,824,375 B2
(45) Date of Patent: Nov. 30, 2004

(54) ARRANGEMENT FOR A CONSECUTIVE TWO-STAGE EJECTOR OF THE BUILT-IN TYPE

(76) Inventor: Hans Müller, Pejlingsvägen 6, Frufällan SE-506 70 (SE)

( * ) Notice: Subject to any disclaimer, the term of this patent is extended or adjusted under 35 U.S.C. 154(b) by 33 days.

(21) Appl. No.: 10/179,705

(22) Filed: Jun. 25, 2002

(65) Prior Publication Data

US 2003/0211195 A1 Nov. 13, 2003

(30) Foreign Application Priority Data

May 8, 2002 (SE) ................................................ 0201403

(51) Int. Cl.⁷ ........................... B29C 43/50; B29C 45/40
(52) U.S. Cl. ....................... 425/236; 425/351; 425/422; 425/443; 425/556
(58) Field of Search ................................ 425/236, 351, 425/422, 441, 443, 444, 556

(56) References Cited

U.S. PATENT DOCUMENTS

| 3,049,758 | A | * | 8/1962 | Drevalas ...................... 425/438 |
| 3,534,443 | A | * | 10/1970 | Tucker ........................ 425/443 |
| 4,239,174 | A | * | 12/1980 | Muller et al. ................. 249/67 |
| 5,011,398 | A | * | 4/1991 | VanRens ...................... 425/444 |
| 6,042,363 | A | * | 3/2000 | Kikuchi ...................... 425/556 |
| 6,179,606 | B1 | * | 1/2001 | Muller ....................... 425/556 |
| 6,379,072 | B1 | * | 4/2002 | Brown et al. ................. 403/31 |

* cited by examiner

Primary Examiner—Benjamin L. Utech
Assistant Examiner—Emmanuel S. Luk
(74) Attorney, Agent, or Firm—Orum & Roth

(57) ABSTRACT

The arrangement is based on the principle that the ejector (9) of a moulding tool actuates the rear ejector plates (5, 5A, 5B) and the front plates (4, 4A, 4A) are conveyed along until the bearing segments (23) reach the free groove (17) in central pin (12). Balancing against misalignment of the ejector package is obtained at the same time through the incorporation of this two-stage ejector, and, at the same time, it replaces extra guides.

16 Claims, 5 Drawing Sheets

ARRANGEMENT FOR A CONSECUTIVE TWO-STAGE EJECTOR OF THE BUILT-IN TYPE

BACKGROUND OF THE INVENTION

1. Field of the Invention

The present invention relates to an arrangement for a consecutive two-stage ejector of the built-in type for moulding tools comprising pairs of moving ejector plates and an actuating device for causing the aforementioned ejector plates to be moved to intended positions.

2. Description of Related Art

Previously disclosed consecutive two-stage ejectors of the kind that are intended for building-in are designed as a rule so that they exhibit a highly advanced actuating device, which is positioned on the front pair of ejector plates. This actuating device is formed by two half moonshaped rings that are produced by wire spark erosion, which is a very time-consuming production process. The previously disclosed two-stage ejectors must also be secured against rotation with rotation-preventing means, which increases the cost.

BRIEF SUMMARY OF THE INVENTION

The principal object of the present invention is, in the first instance, to solve the aforementioned problems by simple and reliably functioning means in conjunction with a moulding machine essentially for the manufacture of plastic components, but also for metal-forming tools, and to achieve a solution that is simple to produce, cost-effective and reliable in service.

The aforementioned object is achieved by means of an arrangement in accordance with the present invention, which is characterized essentially in that rear ejector plates are attached to, and are capable of actuation by, a reciprocating rod that is connected to the tool, in that a central pin extends between the fixed plate of the moulding tool and the body of the moulding tool, in that the aforementioned central pin exhibits an annular groove, in that pairs of sleeves are accommodated by the aforementioned central pin with one sleeve passed onto the other sleeve, in that each of the two sleeves is attached to its own moving ejector plate, in that the inner sleeve exhibits transcurrent recesses corresponding to the desired number of locking segments, in that the outer sleeve exhibits a stop part capable of actuating the aforementioned locking segment, in that the aforementioned locking segments exhibit stop parts capable of interacting with the aforementioned grooves, in that the two ejector plates are attached to one another via an attachment which permits free packing together of the aforementioned pairs of ejector plates, which are retracted to a specified distance from one another, when the aforementioned rear pair of plates is caused respectively to be extended and retracted, in conjunction with which the ejector of the tool is so arranged in an initial phase as to actuate the rear ejector plates and so that the front ejector plates are conveyed along through the interconnection of the two sleeves with the help of the locking segments, and in that, after actuation of the locking segments and their accommodation in the aforementioned annular groove, the front ejector plates are released and the rear ejector plates are so arranged as to be actuated singly by the ejector causing them to be extended to the intended end position.

BRIEF DESCRIPTION OF THE SEVERAL VIEWS OF THE INVENTION

The invention is described below as a number of preferred illustrative embodiments, in conjunction with which reference is made to the accompanying drawings, in which:

FIGS. 1–3 show sectioned views of a two-stage ejector with the different pairs of ejector plates and their actuating parts, in which:

FIG. 1 shows a starting position for extension of the two pairs of moving ejector plates;

FIG. 2 shows the final position for stage I after extension of the two pairs of plates together;

FIG. 3 shows the final position for stage II after continued extension of the rear pair of plates;

DETAILED DESCRIPTION OF THE INVENTION

Figure 1:
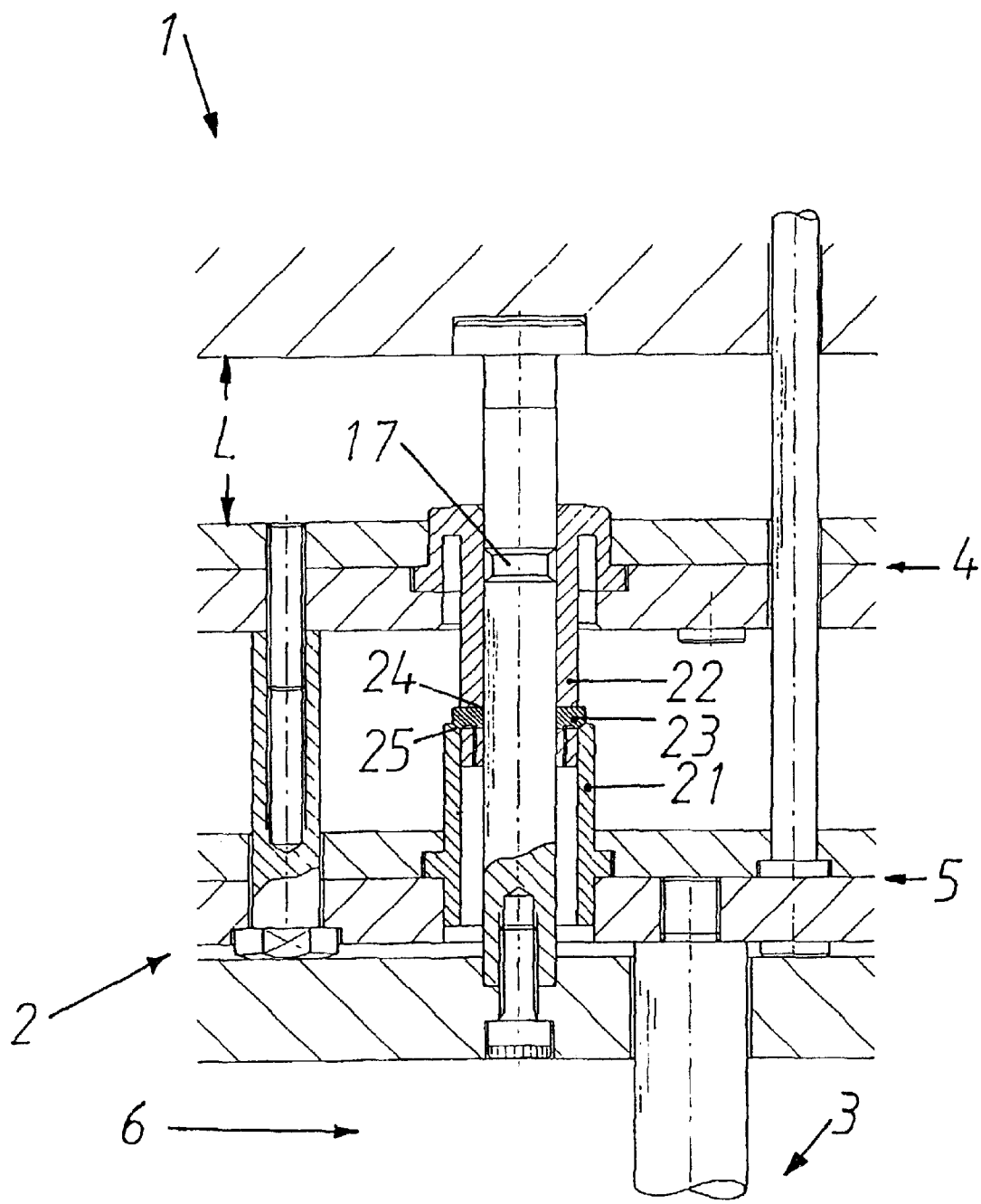
Figure 2:
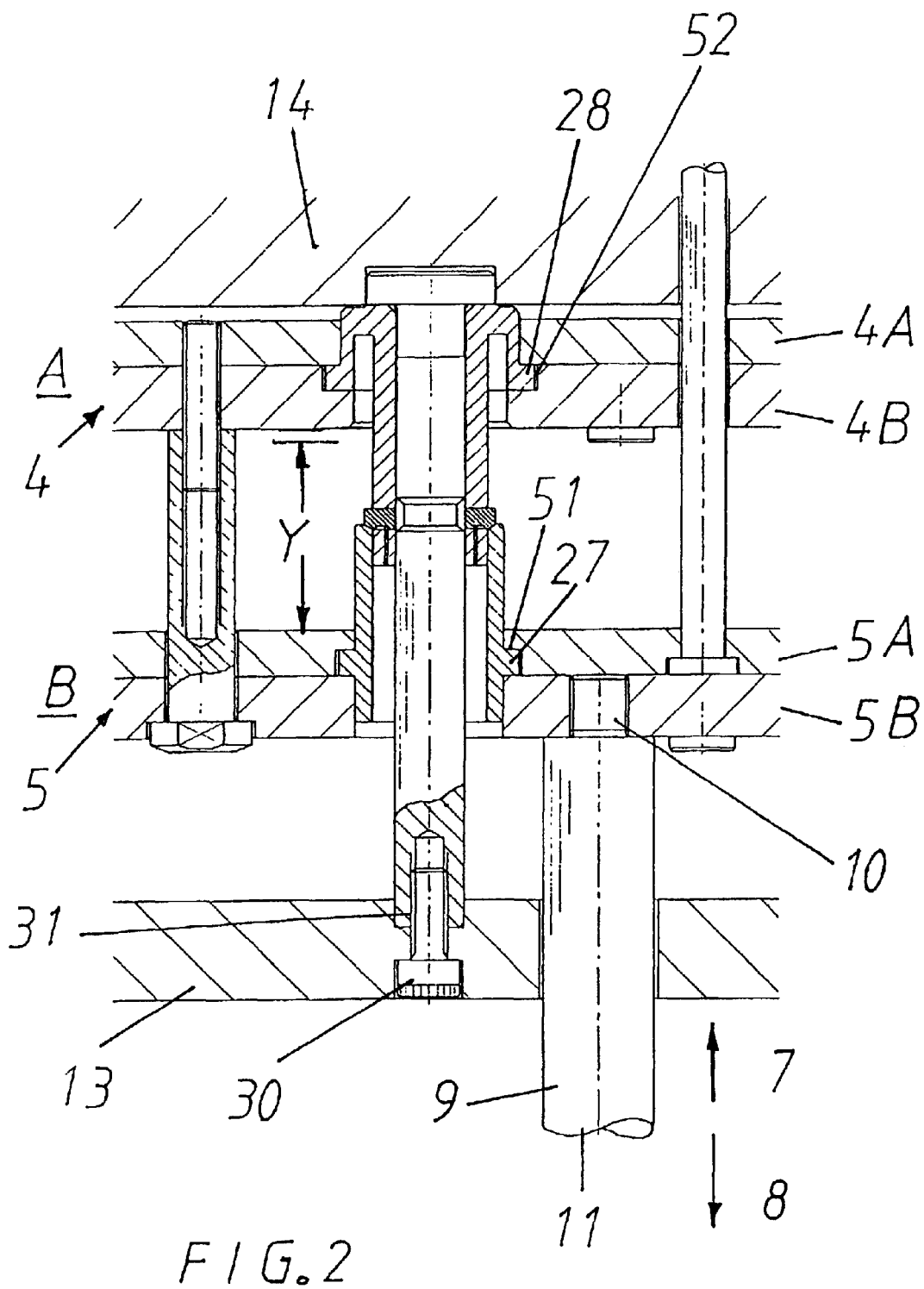
Figure 3:
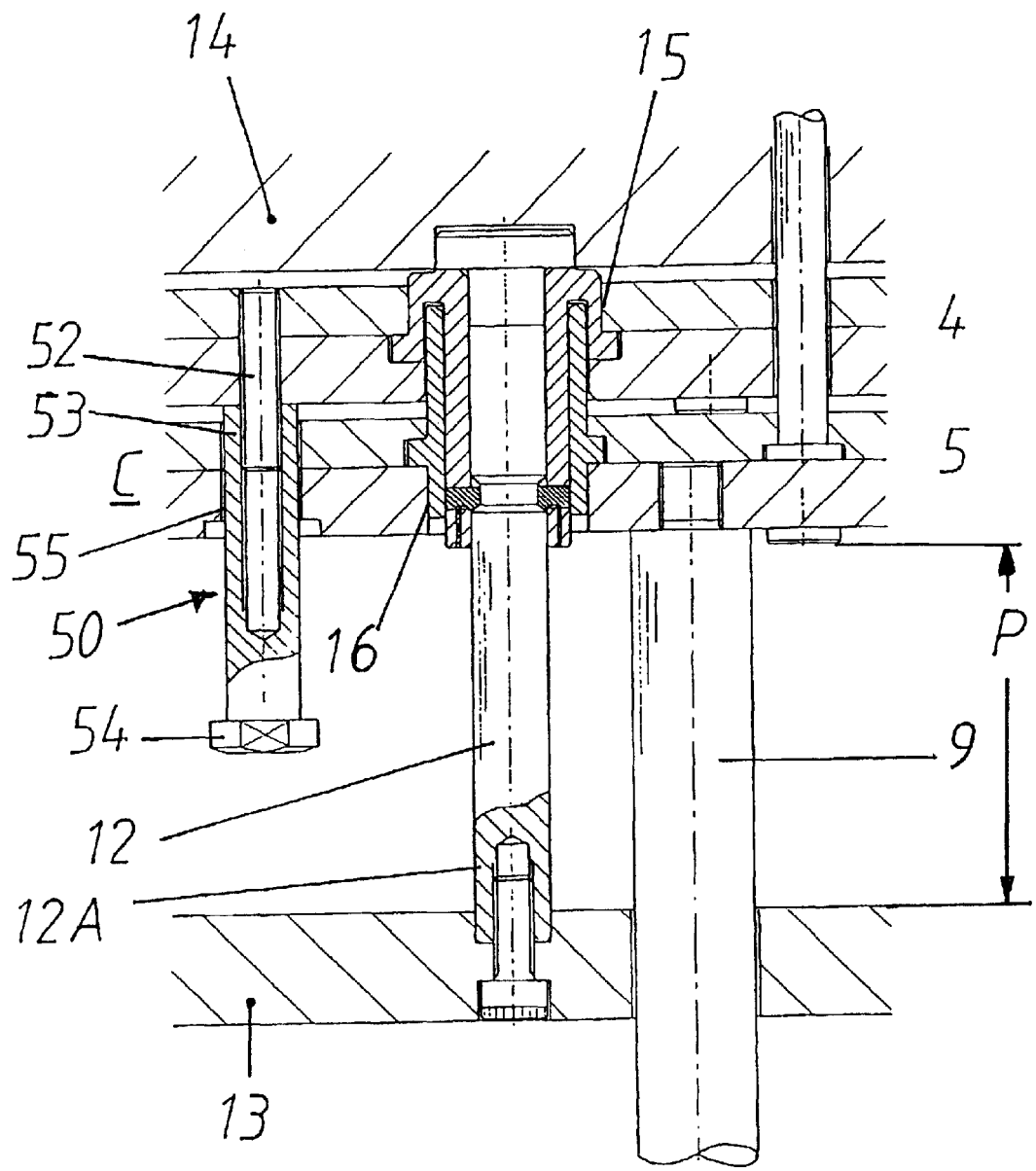

The arrangement in accordance with the invention is suitable for building into one or more desired positions for the extension of formed components on the side, preferably in pairs, or centrally positioned in the middle. The result is that a smooth bottom plate can be achieved on the tool, and that this replaces all the extra guides which previously had to be applied because balancing against misalignment of the ejector package with the plates is now obtained at the same time through the An arrangement 1 for a consecutive two-stage ejector 2, which is of the built-in type intended for moulding tools 3 and comprises pairs of moving front and rear ejector plates 4, 4A, 4B and 5, 5A, 5B and an actuating device 6 comprising inter alia a piston rod 9 for actuating the aforementioned ejector plates 4, 4A, 4B and 5, 5A, 5B and causing them to be displaced to intended positions A, B, C, comprises in accordance with the present invention a special solution for actuation of the various components included in the construction. More specifically, the front ejector plates 4, 4A, 4B, which are preferably duplicated in a previously disclosed fashion in order to simplify their manufacture and assembly, are attached to and capable of actuation by a reciprocating 7, 8 rod 9, which is secured to the aforementioned rear ejector plates 5, 5A, 5B with its threaded front part 10 and is connected to the tool 3 with its rear end part 11.

A central pin 12 extends between the fixed plate 13 of the tool and the body 14 of the tool through openings 15, 16 in the two plates 4, 5. This central pin 12 exhibits an annular groove 17 with inclined stop parts 18, 19 and is situated at a distance from a thickened annular fixed end projection on the aforementioned central pin 12, by means of which the pin 12 is secured to the body 14. Pairs of sleeves 21, 22 are accommodated by the aforementioned central pin 12 with one sleeve 21 passed onto the second sleeve 22 and the pin 12 so that they are capable of being displaced relative to one another in axial directions 7, 8 jointly and separately along the central pin 12. The two sleeves 21, 22 are each attached with their own aforementioned moving ejector plates 4, 4A, 4B; 5, 5A, 5B.

The inner sleeve 22 in this case exhibits transcurrent recesses 24 corresponding to the desired number of locking segments 23, for example six in number, while the outer sleeve 21 exhibits a stop part 25 so arranged as to actuate the aforementioned locking segments 23 in conjunction with the displacement of the aforementioned outer sleeve 21 in an axial direction 7. The aforementioned locking segments 23 exhibit an inclined stop part 26 capable of interacting with the aforementioned groove 17.

The two ejector plates 4, 4A, 4B; 5, 5A, 5B are attached to one another via an attachment 50 which is so arranged as to permit free packing together of the aforementioned pairs of ejector plates 4, 4A, 4B; 5, 5A, 5B, which are retracted to a specified distance Y from one another, when the aforementioned rear pair of plates 5, 5A, 5B is caused respectively to be extended and retracted, in conjunction with which the ejector 9 of the tool is so arranged in an initial phase as to actuate the lower ejector plates 4, 4A, 4B and so that the front ejector plates 5, 5A, 5B are conveyed along through the interconnection of the two sleeves 21, 22 with the help of the locking segments that are maintained at a specific distance Y from one another. After actuation of the locking segments 23 and their accommodation in the aforementioned annular groove 17 in the central pin 12, the front ejector plates 4, 4A, 4B are released and the rear ejector plates 5, 5A, 5B are so arranged as to be actuated singly by the ejector 9 causing them to be extended to the intended end position C.

The two sleeves 21, 22 are interconnected respectively with the pairs of front ejector plates 4, 4A, 4B and with the pairs of rear ejector plates 5, 5A, 5B, each by means of its own flange 27, 28, which are securely clamped. The outer sleeve 21 in this case is interconnected with the rear ejector plates 5, 5A, 5B, by means of a flange 27, which is accommodated in a recess 51 in one 5A or 5B or both pairs of lower ejector plates 5A, 5B, while the inner sleeve 22 can be interconnected with the front ejector plates 4A, 4B by means of a flange 28, which is accommodated in a recess 52 in one 4A or 4B or both pairs of upper ejector plates 4A, 4B.

In order to determine the length of stroke Y number one, the central pin 12 is shortened on its lower side 12A, while at the same time a lower linear height is selected for the ejector package. In order to achieve the desired length of stroke number two, the outer sleeve 21 in the rear ejector plates 5A, 5B is manufactured in a number of different fixed lengths. For example these may be three in number. By recessing the flange 27 on this sleeve 21 Into the rear plate 5A, 5B, an additional changed length of stroke number two is obtained.

In order to guarantee the right distance Y between the rear 5 and the front 4 ejector package, a number of adjuster screws 53, 54 with a foot 54 has been installed on the side of the arrangement, of which at least two are used in order to give balance. The distance Y can be changed by screwing the two screws 53, 54 relative to one another in the desired direction.

The first screw 52, which is threaded externally, is attached to the front plate 4, while the second screw 53, which has an internally threaded part, accommodates the first screw 52 and extends freely through an opening 55 in the rear plate 5.

The foot 54 on the adjuster screw also prevents the front ejector plates 4, 4A, 4B from moving forwards too early unintentionally. The arrangement can be built in, one to wither side of the mould, or one in the middle in the case of a smaller mould. In the latter case, an extra ejector plate 150 is used, which moves in the central hole 152 of the machine table and sits on a spacer collar 153.

Balancing against misalignment of the ejector package is obtained at the same time through the incorporation of this two-stage ejector, and it replaces extra guides at the same time.

The function of the arrangement 1 is thus as follows:

The ejector 9 of the tool causes the lower ejector plates 5A, 5B and the upper ejector plates 4A, 4B to be extended forwards via protruding segments 23, which, after the first length of stroke L, expose the following length of stroke Y. Because no slotted sleeves or bridging parts are required in this embodiment, this built-in two-stage ejector is more reliable in service, easier to produce and not dependent on a specific rotational position.

Extension of the first sleeve 22, i.e. the sleeve located furthest to the front in the package and is referred to as the inner sleeve, is restricted by the body 14 of the tool, in conjunction with which the ejector 9 of the tool is so arranged in an initial phase as to actuate the rear the side of the arrangement, of which at least two are used in order to give balance. The distance Y can be changed by screwing the two screws 53, 54 relative to one another in the desired direction.

The first screw 52, which is threaded externally, is attached to the front plate 4, while the second screw 53, which has an internally threaded part, accommodates the first screw 52 and extends freely through an opening 55 in the rear plate 5.

The foot 54 on the adjuster screw also prevents the front ejector plates 4, 4A, 4B from moving forwards too early unintentionally. The arrangement can be built in, one to wither side of the mould, or one in the, middle in the case of a smaller mould. In the latter case, an extra ejector plate 150 is used, which moves in the central hole 152 of the machine table and sits on a spacer collar 153.

Balancing against misalignment of the ejector package is obtained at the same time through the incorporation of this two-stage ejector, and it replaces extra guides at the same time.

The function of the arrangement 1 is thus as follows:

The ejector 9 of the tool causes the lower ejector plates 5A, 5B and the upper ejector plates 4A, 4B to be extended forwards via protruding segments 23, which, after the first length of stroke L, expose the following length of stroke Y. Because no slotted sleeves or bridging parts are required in this embodiment, this built-in two-stage ejector is more reliable in service, easier to produce and not dependent on a specific rotational position.

Extension of the first sleeve 22, i.e. the sleeve located furthest to the front in the package and is referred to as the inner sleeve, is restricted by the body 14 of the tool, in conjunction with which the ejector 9 of the tool is so arranged in an initial phase as to actuate the rear ejector plates 5, 5A, 5B, and so that these and the front ejector plates 4, 4A, 4B are interconnected with the help of the locking segments 23, so that, after actuation of the locking segments 23 and their accommodation in the aforementioned annular groove 17, the rear ejector plates 5, 5A, 5B are released so that they are then so arranged as to be actuated singly by the ejector 9 causing them to be extended to the intended end position C.

Retraction of the plates 4, 4A, 4B; 5, 5A, 5B takes place in the reverse of the sequence indicated above.

The two sleeves 21, 22 are interconnected respectively with the pairs of front ejector plates 4, 4A, 4B and with the pairs of rear ejector plates 5, 5A, 5B, each by means of its own flange 27, 28, which are securely clamped between the pairs of plates. The length of stroke L for the front ejector plates 4, 4A, 4B is determined by the length of the aforementioned central pin 12, and by cutting the pin 12 to the desired length at its rear end 12A, it is possible to determine the length of stroke L that it is wished to obtain with the arrangement 1. By means of a bolt 30 that is screwed into a threaded central hole 31 in the central pin 12, the rear end 12A of the central pin is secured to the fixed plate 13, i.e. the tool plate.

The aforementioned locking segments 23 exhibit mutually opposing inclined stop surfaces 26, 33, with which stop parts 25 and 18 inclined respectively to a corresponding degree in the aforementioned outer sleeve 21 and in the annular groove 17 are capable of interacting in order, by so doing, to achieve radial displacement of the locking segments 23 respectively in a direction inwards 35 and in a direction outwards 36 after actuation and interaction when the inner sleeve 22 is displaced relative to the outer sleeve 21 and relative to the central pin 12.

In order to ensure that the locking segments 23 are retained in position in associated recesses 24 in the inner sleeve 22, so that they are not displaced too far and fall out of the aforementioned recesses 24 in the sleeve 22, each of the locking segments 23 can exhibit its own axial, channel-shaped hollow 37, which extends radially for the desired distance for which it is wished for the locking segments 23 to be capable of being displaced without falling out of the aforementioned sleeve 22, and in which hollow 37 a pin 38 is capable of being accommodated in order to ensure the aforementioned retention of the locking segments 23.

The length of stroke P of the additional extending rear ejector plates 5, 5A, 5B is determined by the ejector 9 of the tool, although this distance must not exceed an indicated maximum value.

Figure 4:
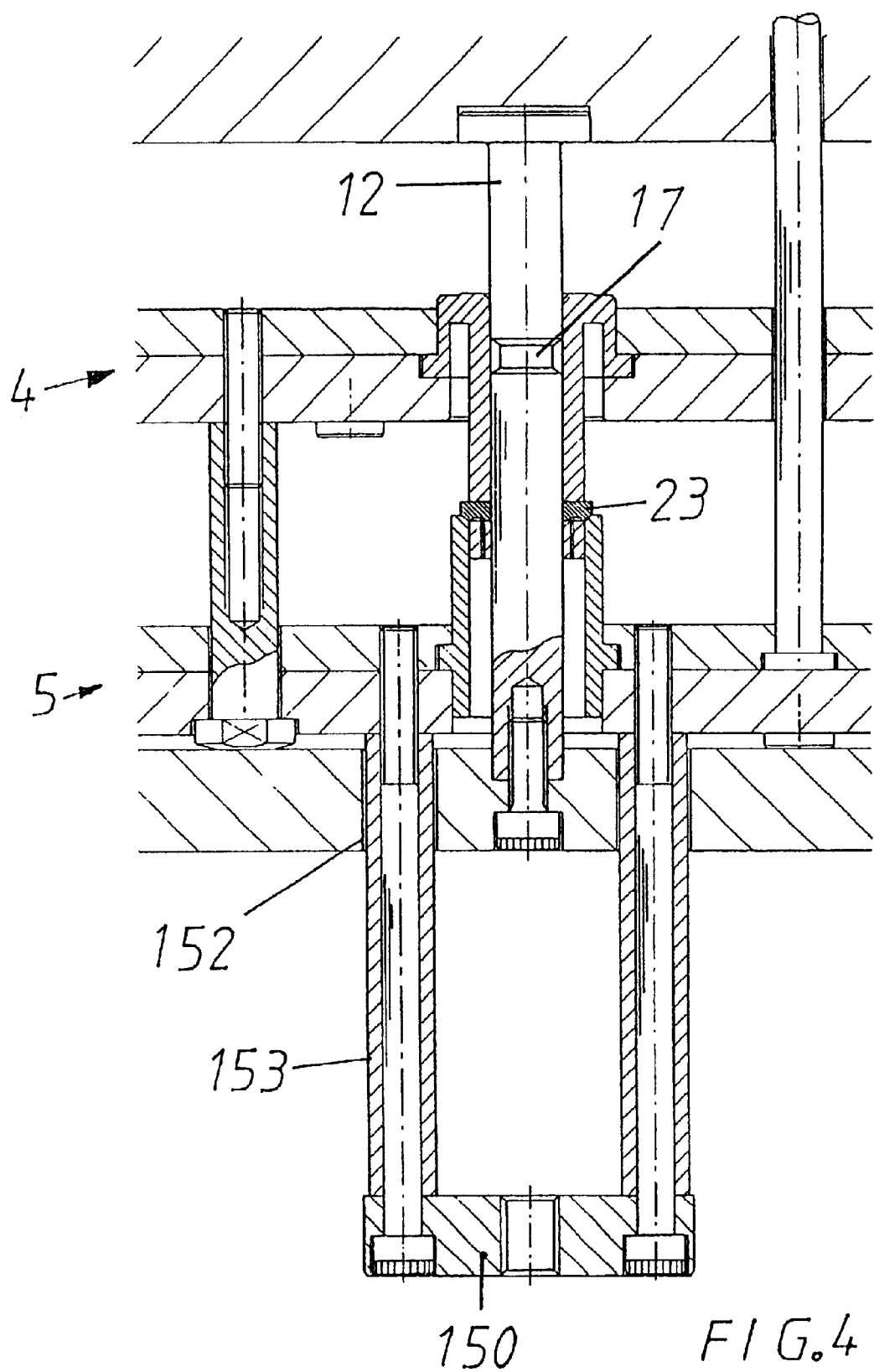
FIG. 4 show a variant with an extra ejector plate.
Figure 5:
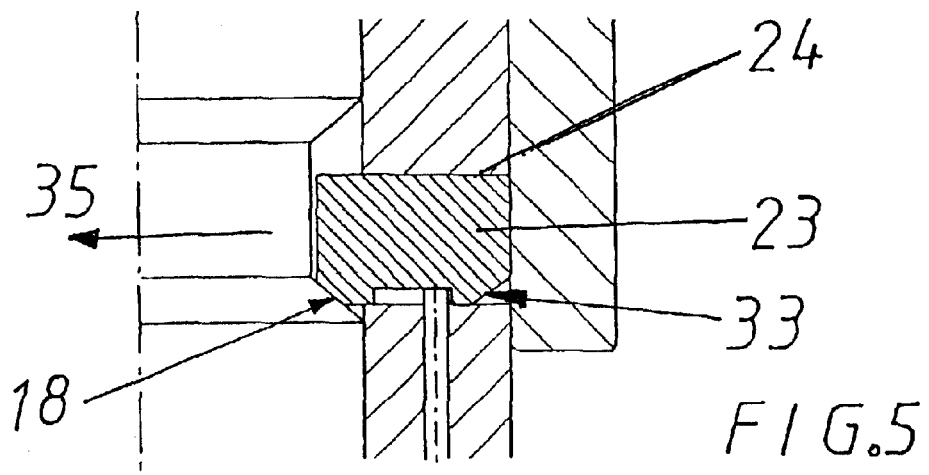
FIGS. 5–7 show in detail the interaction between a segment and an actuating part and a pin groove respectively.
Figure 6:
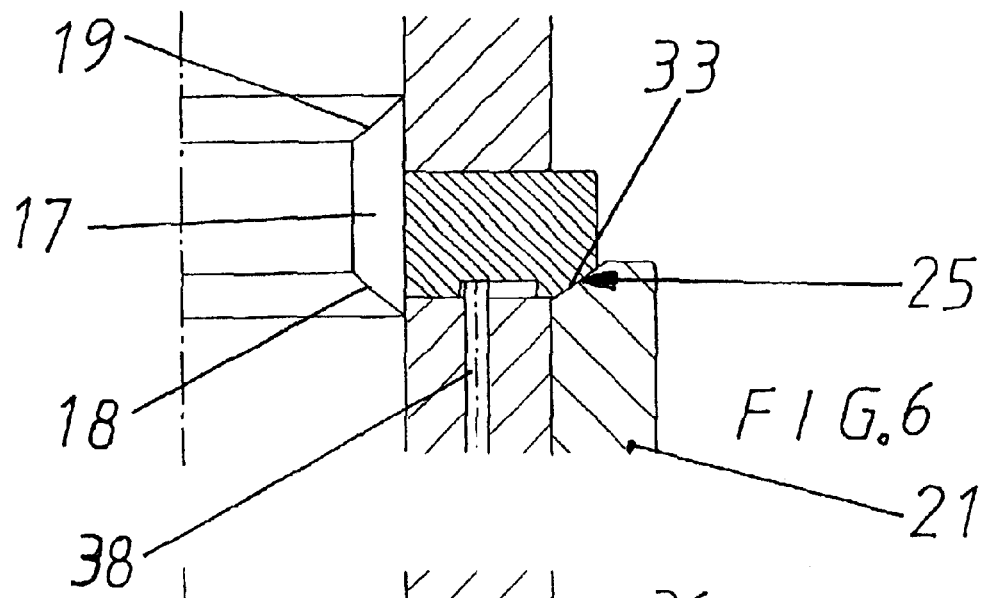
Figure 7:
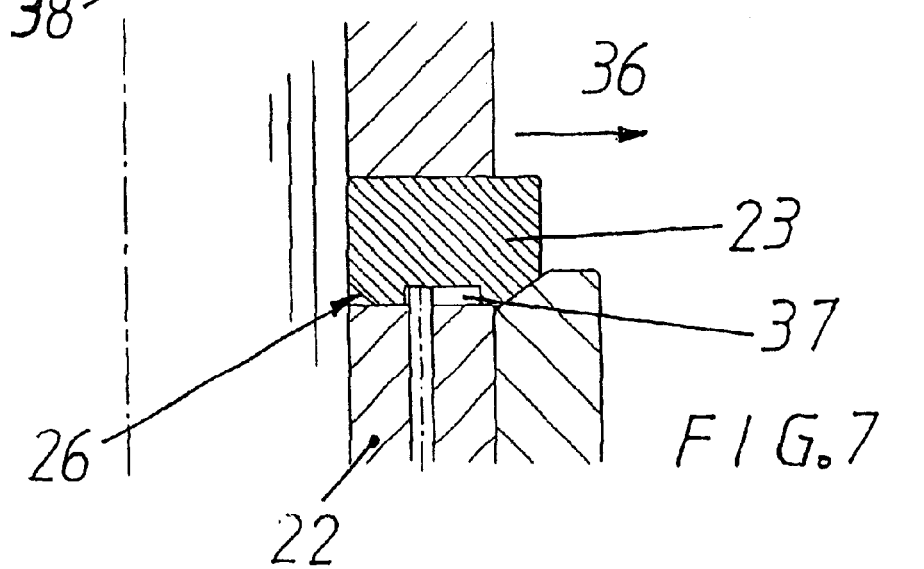

The arrangement 1 can thus, as shown in FIG. 4, be built into the middle of the tool with the help of an extra ejector plate 150, which is supported by uprights 151 which pass into a central hole 152 in the machine table 13 or one to either side of the tool. The latter method of incorporation permits an entirely smooth bottom to be obtained on the tool after removing the ejector pin at the centre.

The function is identical, however, in accordance with the illustrative embodiments shown here. It is thus based on the ejector 9 of the tool actuating the rear ejector plates 5, 5A, 5B, and the front plates 4, 4A, 4B being forced to be conveyed along until the bearing locking segments 23 reach the accommodating groove 17 in the central pin 12.

The function and the nature of the invention can be appreciated from the above description and the illustrations in the drawings.

The invention is naturally not restricted to the above description and the embodiments illustrated in the accompanying drawings. Modifications are possible, especially with regard to the nature of the various component parts, or by the use of equivalent technology, without departing from the area of protection afforded to the invention as defined in the Patent claims.

What is claimed is:

1. Arrangement for a consecutive two-stage ejector of the built-in type for moulding tools comprising pairs of moving ejector plates and an actuating device for causing the ejector plates to be moved to intended positions, comprising
    rear ejector plates attached to, and are capable of actuation by, a reciprocating rod that is connected to the tool,
    a central pin extending between the fixed plate of the moulding tool and a body of the moulding tool,
    the central pin exhibits an annular groove,
    a plurality of adjustment screws, said adjustment screws comprising a first screw attached to a front ejector plate and a second screw adapted to accommodate the first screw and extending through an apperature in the rear ejector plate,
    pairs of sleeves are accommodated by the central pin with one sleeve passed onto the other sleeve,
    each of the two sleeves is attached to its own moving ejector plate,
    an inner sleeve exhibits transcurrent recesses corresponding to the desired number of locking segments,
    an outer sleeve exhibits a stop part capable of actuating the locking segment,
    the locking segments exhibit stop parts capable of interacting with the groove,
    the two ejector plates are attached to one another via an attachment which permits free packing together of the pairs of ejector plates, which are retracted to a specified distance from one another, when the rear pair of plates is caused respectively to be extended and retracted, in conjunction with which the ejector of the tool is so arranged in an initial phase as to actuate the rear ejector plates and so that the front ejector plates are conveyed along through the interconnection of the two sleeves with the help of the locking segments, and in that, after actuation of the locking segments and their accommodation in the annular groove, the front ejector plates are released and the rear ejector plates are so arranged as to be actuated singly by the ejector causing them to be extended to the intended end position
    a connection between the two pairs of plates is formed by a rod attached to the front pair of plates which exhibits a stop at its opposing end, and
    a connection is so arranged as to be adjustable for length and is formed by an internally threaded sleeve and a threaded pin attached thereto, together with a thickened head arranged at the free end of the sleeve which exhibits a means of attachment for a spanner,
    wherein the distance between the rear ejector plate and the front ejector plate can be adjusted by screwing the two adjustment screws relative to one another in the desired direction.

2. Arrangement in accordance with Patent claim 1, characterized in that the two sleeves are interconnected respectively with the pairs of front ejector plates and with the pairs of rear ejector plates, each by means of its own flange, which is securely clamped.

3. Arrangement in accordance with Patent claim 2, characterized in that the outer sleeve is interconnected with the rear ejector plates by means of a flange, which is accommodated in a recess in one of the two pairs of rear ejector plates.

4. Arrangement in accordance with Patent claim 2, characterized in that the inner sleeve is interconnected with the front ejector plates by means of a flange, which is accommodated in a recess in one of the two pairs of front ejector plates.

5. Arrangement in accordance with Patent claim 1, characterized in that the two sleeves are so arranged as to extend through a centrally located hole in the front and rear ejector plates.

6. Arrangement in accordance with Patent claim 1, characterized in that the length of stroke for the front ejector plates is determined by the length of the aforementioned central pin.

7. Arrangement in accordance with Patent claim 1, characterized in that the locking segments exhibit mutually opposing inclined stop surfaces, with which an inclined stop part in the outer sleeve and in the annular groove are capable of interacting for radial displacement of the locking segments respectively in a direction inwards and in a direction outwards.

8. Arrangement in accordance with Patent claim 1, characterized in that each of the locking segments exhibits its own axial hollow, in which a pin is capable of being accommodated in order to ensure the retention of the locking segment in associated recesses in the inner sleeve.

9. Arrangement in accordance with Patent claim 1, characterized in that an extra ejector plate is connected to the plates at their center.

10. Arrangement in accordance with Patent claim 2, characterized in that the two sleeves are so arranged as to extend through a centrally located hole in the front and rear ejector plates.

11. Arrangement in accordance with Patent claim 3, characterized in that the two sleeves are so arranged as to extend through a centrally located hole in the front and rear ejector plates.

12. Arrangement in accordance with Patent claim 4, characterized in that the two sleeves are so arranged as to extend through a centrally located hole in the front and rear ejector plates.

13. Arrangement in accordance with Patent claim 2, characterized in that the length of stroke for the front ejector plates is determined by the length of the central pin.

14. Arrangement in accordance with Patent claim 3, characterized in that the length of stroke for the front ejector plates is determined by the length of the central pin.

15. Arrangement in accordance with Patent claim 4, characterized in that the length of stroke for the front ejector plates is determined by the length of the central pin.

16. Arrangement in accordance with Patent claim 5, characterized in that the length of stroke for the front ejector plates is determined by the length of the central pin.

* * * * *